US010123339B1

(12) United States Patent
Bertz et al.

(10) Patent No.: US 10,123,339 B1
(45) Date of Patent: Nov. 6, 2018

(54) TRANSITIONING A UE TO A NEW PCELL WITHOUT HANDOVER PROCESSING

(71) Applicant: Sprint Spectrum L.P., Overland Park, KS (US)

(72) Inventors: Lyle T. Bertz, Lee's Summit, MO (US); George Cummings, Gilbert, AZ (US); John J. Humbert, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 474 days.

(21) Appl. No.: 14/671,022

(22) Filed: Mar. 27, 2015

(51) Int. Cl.
*H04W 74/08* (2009.01)
*H04W 72/08* (2009.01)
*H04W 36/00* (2009.01)
*H04W 76/27* (2018.01)
*H04W 72/04* (2009.01)

(52) U.S. Cl.
CPC ..... *H04W 72/085* (2013.01); *H04W 36/0083* (2013.01); *H04W 76/27* (2018.02); *H04W 72/0453* (2013.01)

(58) Field of Classification Search
CPC combination set(s) only.
See application file for complete search history.

(56) References Cited

U.S. PATENT DOCUMENTS

| 8,385,959 | B2 * | 2/2013 | Lee | H04L 5/001 370/328 |
| 2007/0091789 | A1 * | 4/2007 | Thukral | H04L 69/14 370/216 |
| 2011/0261704 | A1 * | 10/2011 | Etemad | H04W 52/0216 370/252 |
| 2012/0213130 | A1 * | 8/2012 | Zhang | H04L 5/001 370/280 |
| 2012/0281600 | A1 * | 11/2012 | Tseng | H04W 76/048 370/280 |
| 2013/0165126 | A1 | 6/2013 | Wei | |

OTHER PUBLICATIONS

Pending U.S. Appl. No. 14/592,556, filed Jan. 8, 2015.
Pending U.S. Appl. No. 14/609,617, filed Jan. 30, 2015.

* cited by examiner

*Primary Examiner* — Yemane Mesfin
*Assistant Examiner* — Mon Cheri Davenport

(57) ABSTRACT

Disclosed is a method and system for managing carriers on which a wireless communication system serves a UE over an established radio-link-layer connection. As disclosed, a base station serves the UE with carrier aggregation service using (i) a first carrier as a primary carrier for the UE and (ii) a second carrier as a secondary carrier for the UE. While serving the UE, the system determines that the base station should serve the UE with the carrier aggregation service using (i) the first carrier as the secondary carrier and (ii) the second carrier as the primary carrier. In response to the determination and while maintaining the established radio-link-layer connection with the UE, the system causes the base station to serve the UE with the carrier aggregation service using (i) the first carrier as the secondary carrier and (ii) the second carrier as the primary carrier.

17 Claims, 11 Drawing Sheets

TRANSITIONING A UE TO A NEW PCELL WITHOUT HANDOVER PROCESSING

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In accordance with a recent version of the LTE standard of the Universal Mobile Telecommunications System (UMTS), for instance, each coverage area of a base station may operate on one or more carriers spanning 1.4 MHz, 3 MHz, 5 MHz, 10 MHz, 15 MHz, or 20 MHz, with each carrier divided primarily into subcarriers spaced apart from each other by 15 kHz. Further, the air interface is divided over time into a continuum of 10-millisecond frames, with each frame being further divided into ten 1-millisecond subframes or transmission time intervals (TTIs) that are in turn each divided into two 0.5-millisecond segments. In each 0.5 millisecond segment or in each 1 millisecond TTI, the air interface is then considered to define a number of 12-subcarrier wide "resource blocks" spanning the frequency bandwidth (i.e., as many as would fit in the given frequency bandwidth). In addition, each resource block is divided over time into symbol segments of 67 μs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the base station to UEs, and other resource elements are reserved to define a physical downlink shared channel (PDSCH) for carrying bearer data transmissions from the base station to UEs. Likewise, on the uplink, certain resource elements across the bandwidth are reserved to define a physical uplink control channel (PUCCH) for carrying control signaling from UEs to the base station, and other resource elements are reserved to define a physical uplink shared channel (PUSCH) for carrying bearer data transmissions from UEs to the base station.

In a system arranged as described above, when a UE enters into coverage of a base station, the UE may engage in attach signaling with the base station, by which the UE would register to be served by the base station on a particular carrier. Through the attach process and/or subsequently, the base station and supporting LTE network infrastructure may establish for the UE one or more bearers, essentially defining logical tunnels for carrying bearer data between the UE and a transport network such as the Internet.

Once attached with the base station, a UE may then operate in a "connected" mode in which the base station may schedule data communication to and from the UE on the UE's established bearer(s). In particular, when a UE has data to transmit to the base station, the UE may transmit a scheduling request to the base station, and the base station may responsively allocate one or more upcoming resource blocks on the PUSCH to carry that bearer traffic and transmit on the PDCCH to the UE a downlink control information (DCI) message that directs the UE to transmit the bearer traffic in the allocated resource blocks, and the UE may then do so. Likewise, when the base station has bearer traffic to transmit to the UE, the base station may allocate PDSCH resource blocks to carry that bearer traffic and may transmit on the PDCCH to the UE a DCI message that directs the UE to receive the bearer traffic in the allocated resource blocks, and the base station may thus transmit the bearer traffic in the allocated resource blocks to the UE. LTE also supports uplink control signaling on the PUCCH using uplink control information (UCI) messages. UCI messages can carry scheduling requests from UEs, requesting the base station to allocate PUSCH resource blocks for uplink bearer data communication.

When a UE is attached with a base station on a particular carrier (e.g., pair of downlink carrier and uplink carrier), the base station provides DCIs to the UE on the PDCCH of that particular carrier and schedules downlink communication of bearer data to the UE on the PDSCH of that particular carrier. In another arrangement, a revision of LTE known as LTE-Advanced may permit a base station to serve a UE with "carrier aggregation," by which the base station schedules bearer communication with one or more UEs on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between a base station and a UE using a single carrier is 20 MHz. Using carrier aggregation, a base station may increase the maximum bandwidth to up to 100 MHz by aggregating up to five carriers.

When carriers are aggregated, each carrier may be referred to as a component carrier. Of the component carriers, one may be a primary carrier (or "PCell") and the others may be secondary carriers (or "SCells"). The primary carrier may be the carrier that the UE receives with the strongest signal and/or may be the only carrier on which control signaling is transmitted (e.g., the carrier on which the UE is attached). However, other factors may be taken into account when assigning a primary carrier. With carrier aggregation, a base station may provide a DCI message to a UE on the primary carrier, but may use that DCI message to schedule downlink communication of bearer data to the UE on two or more carriers at time, such as on both the PDSCH of the UE's primary carrier and the PDSCH of one or more secondary carriers. Alternatively, the base station may provide DCI messages on multiple carriers concurrently to schedule concurrent PDSCH communication on the multiple carriers.

OVERVIEW

In practice, a base station may have an established radio-link-layer connection with a UE and may serve the UE with carrier aggregation service over the radio-link-layer connection. While having the established radio-link-layer connection, the base station may configure the carrier aggregation service by transmitting to the UE a radio-link control message (e.g., a Radio Resource Control (RRC) connection reconfiguration message). Such a radio-link control message may designate a first carrier as a primary carrier in the carrier aggregation service and may designate a second carrier as a secondary carrier in the carrier aggregation service. In some cases, the radio-link control message may also specify other carriers (e.g., in addition to the second carrier) as secondary carriers in the carrier aggregation service.

Once the UE receives the radio-link control message, the UE may store the designations specified in the message such that the UE can tune to the appropriate carriers as it is being served. For instance, the message may designate each carrier by a corresponding index and the UE may store the corresponding indexes for future reference by the UE. By standard, an index of 0 (zero) is used as the index for the primary carrier and any of 1 to 7 are used as an index respectively for each secondary carrier. Moreover, when the base station instructs the UE to use a particular carrier (e.g., the second carrier) as a secondary carrier, the base station informs the UE of a particular index (e.g., 1) to use for referring to that carrier. In this manner, the base station configures the carrier aggregation service to use the first carrier as the primary carrier for the UE and to use the second carrier as a secondary carrier for the UE.

Under some circumstances, a wireless communication system (e.g., the base station or another entity of the system) may determine that the UE should transition to being served by a different carrier as the primary carrier for the UE. For instance, the system may determine that the base station should serve the UE using the second carrier as the primary carrier for the UE and using the first carrier as a secondary carrier for the UE. Various circumstances may trigger such a determination. As an example, the system may determine that the first carrier is threshold loaded and thus lacks sufficient resources for appropriately serving as the primary carrier for the UE. Other examples are also possible.

Generally, the wireless communication system engages in handover processing in order to transition the UE to being served by a different carrier as the primary carrier. The wireless communication system engages in such handover processing even if the transition is between carriers of the same physical base station. By way of example, this handover processing may first involve detaching the UE from the carrier that currently serves as the primary carrier for the UE (e.g., the first carrier). This may specifically involve tearing down the bearer connection that was established for the UE and/or tearing down tunnels established for carrying bearer data between the base station and the transport network.

Once the UE is detached from the carrier at issue, the handover processing next involves re-attaching the UE on a different carrier (e.g., the second carrier) such as by re-establishing for the UE one or more bearers for carrying control signaling and/or bearer data on this different carrier. In some cases, the process may also involve configuring carrier aggregation service (e.g., over a re-established radio-link-layer connection) by transmitting to the UE another radio-link control message. This radio-link control message may specify the different carrier (e.g., the second carrier) as the primary carrier for the UE and may specify other carriers (e.g., the first carrier) as secondary carriers for the UE. Overall, such handover processing may result in unnecessary consumption of network resources and/or delays in transmission of bearer data, among other undesirable outcomes.

Disclosed herein is an arrangement to help overcome problems resulting from engagement in handover processing when a determination is made that the base station should use a different carrier as the primary carrier for the UE. In accordance with the disclosure, the system maintains the established radio-link-layer connection while the system designates a different carrier as the primary carrier for the UE. In particular, while maintaining the established radio-link-layer connection, the system may re-configure the carrier aggregation service by transmitting from the base station to the UE a radio-link control message.

By way of example, the radio-link control message may designate the second carrier as the primary carrier for the UE and may designate the first carrier as a secondary carrier for the UE. The radio-link control message may do so by instructing the UE to essentially swap the stored designations for the first and second carrier. For instance, once the UE receives the message, the UE may swap the stored indexes for the first and second carriers such that the second carrier is designated with the 0 (zero) index and such that the first carrier is designated with the 1 index that has previously designated the second carrier. In some cases, however, the system can designate the first carrier with any of the 1 to 7 indexes that correspond to a carrier being a secondary carrier. In either case, once the UE carries out the swap, the UE can then tune to the second carrier as the primary carrier in the carrier aggregation service and to the first carrier as a secondary carrier in the carrier aggregation service.

Accordingly, disclosed herein is a method operable in a wireless communication system including a base station having an established radio-link-layer connection with a UE. In particular, the radio-link-layer connection encompasses a first carrier and a second carrier. Moreover, the base station is configured to provide the UE with carrier aggregation service using the first and second carriers. In accordance with the method, the base station serves the UE with the carrier aggregation service using (i) the first carrier as a primary carrier for the UE and (ii) the second carrier as a secondary carrier for the UE.

While serving the UE, the wireless communication system (e.g., the base station or another entity) makes a determination that the base station should serve the UE with the carrier aggregation service using (i) the first carrier as the secondary carrier for the UE and (ii) the second carrier as the primary carrier for the UE. In response to the determination and while maintaining the established radio-link-layer connection with the UE, the wireless communication system then causes the base station to serve the UE with the carrier aggregation service using (i) the first carrier as the secondary carrier for the UE and (ii) the second carrier as the primary carrier for the UE.

Additionally, disclosed herein is method for managing component carriers in carrier aggregation service. In accordance with the method, a base station configures carrier aggregation service for a UE over a radio-link-layer connection between the base station and the UE. Configuring the carrier aggregation service involves transmitting from the base station to the UE at least one radio-link control message designating a first carrier as a primary component carrier in the carrier aggregation service and designating a second carrier as one of at least one secondary component carrier in the carrier aggregation service. The base station then serves the UE with the configured carrier aggregation service over the radio-link-layer connection.

While serving the UE with the carrier aggregation service over the radio-link-layer connection, the base station encounters a trigger to swap the first carrier and the second carrier in the carrier aggregation service. Responsive to encountering the trigger, the base station re-configures the carrier aggregation service while maintaining the radio-link-layer connection. In particular, re-configuring the carrier aggregation service involves transmitting from the base station to the UE at least one radio-link control message designating the second carrier as the primary component carrier in the carrier aggregation service and designating the first carrier as one of the at least one secondary component carrier in the carrier aggregation service. The base station then serves the UE with the re-configured carrier aggregation service over the radio-link-layer connection.

Further, disclosed herein is a wireless communication system including a base station and a controller that may be separate from the base station or may be part of the base station. In particular, the controller is configured to cause the base station to perform operations.

The operations include configuring carrier aggregation service for a UE over a radio-link-layer connection between the base station and the UE. In particular, configuring the carrier aggregation service involves transmitting from the base station to the UE at least one radio-link control message designating a first carrier as a primary cell (PCell) in the carrier aggregation service and designating a second carrier as one of at least one secondary cell (SCell) in the carrier aggregation service. The operations also include then serving the UE with the configured carrier aggregation service over the radio-link-layer connection.

The operations additionally include, while serving the UE with the carrier aggregation service over the radio-link-layer connection, encountering a trigger to add a third carrier to the carrier aggregation service and then serve the UE with the carrier aggregation service using the third carrier as the PCell for the UE. The operations further include, responsive to encountering the trigger, re-configuring the carrier aggregation service while maintaining the radio-link-layer connection. In particular, re-configuring the carrier aggregation service involves transmitting from the base station to the UE at least one other radio-link control message (i) to add the third carrier to the carrier aggregation service and (ii) to designate the third carrier as the PCell in the carrier aggregation service and to designate the first and second carriers as SCells in the carrier aggregation service. The operations then include serving the UE with the re-configured carrier aggregation service over the radio-link-layer connection.

Further, in another respect, disclosed is a non-transitory computer-readable medium having stored thereon instructions executable by a processor to cause a wireless communication system to carry out functions such as those noted above, to facilitate transition of a UE to a new PCell.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
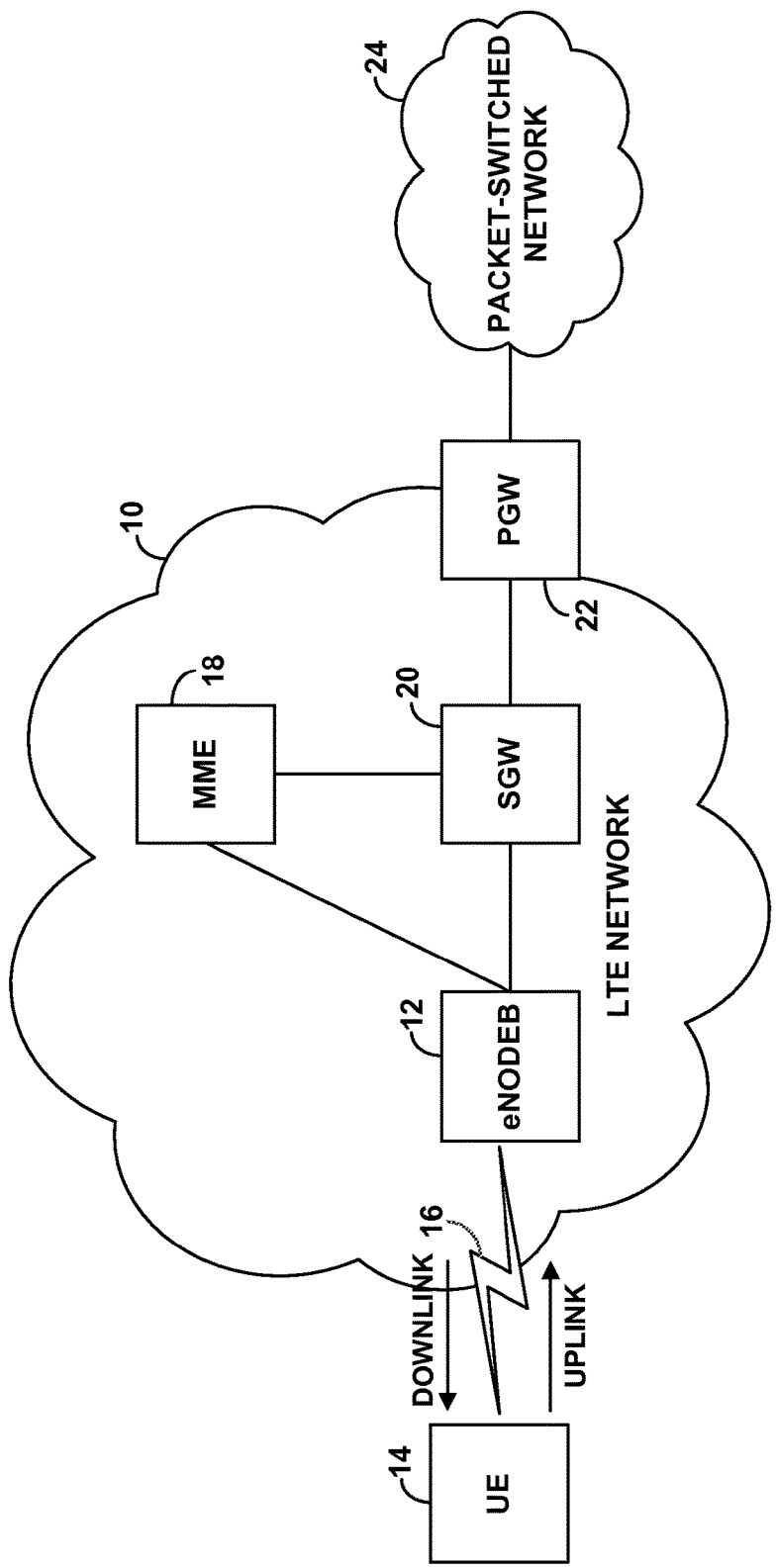
FIG. 1 is a simplified block diagram of a wireless communication system in which the present method can be implemented.

Referring to the drawings, FIG. 1 is a simplified block diagram of a wireless communication system in which the present method can be implemented. In particular, FIG. 1 depicts a representative LTE network 10, which functions primarily to serve UEs with wireless packet data communication service, including possibly voice over Internet Protocol (VoIP) service, but may also provide other functions. As shown, the LTE network 10 includes at least one example LTE macro base station 12 known as an eNodeB, which has an antenna structure and associated equipment for providing an LTE coverage area in which to serve UEs such as an example UE 14. More specifically, the eNodeB 12 radiates to define a wireless air interface 16 through which the eNodeB 12 may communicate with one or more served UEs, such as UE 14, via the downlink and the uplink.

As shown in FIG. 1, the eNodeB 12 has a communication interface with a Mobility Management Entity (MME) 18. The MME 18 can function as a signaling controller for the LTE network 10. Further, the eNodeB 12 has a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeB 12 may be communicatively linked with a core network, which may be operated by a wireless service provider. The core network then provides connectivity with one or more MMEs, such as MME 18, as well as one or more gateways such as SGW 20 and PGW 22.

In a wireless communication system, a base station (such as eNodeB 12) may operate to serve UEs over the air interface on one or more carriers that may each span some frequency bandwidth. The one or more carriers may include a set of air interface resources reserved to define a downlink frequency channel and/or may include a set of air interface resources reserved to define an uplink frequency channel. With this arrangement, the base station may transmit bearer data and/or control signaling (e.g., to a UE) on the downlink frequency channel. Additionally, the base station may receive bearer data and/or control signaling (e.g., from a UE) on the uplink frequency channel.

Further, the base station in a wireless communication system can take various forms. For instance, the base station could be a macro base station operated by a wireless carrier to provide a broad range of coverage and may thus include a tall antenna tower and a power amplifier for providing high transmission power. Alternatively, the base station could be a small cell base station ("small cell"), such as a femtocell, typically having a much smaller form factor and operating at lower transmission power for providing a smaller range of coverage.

Figure 2:
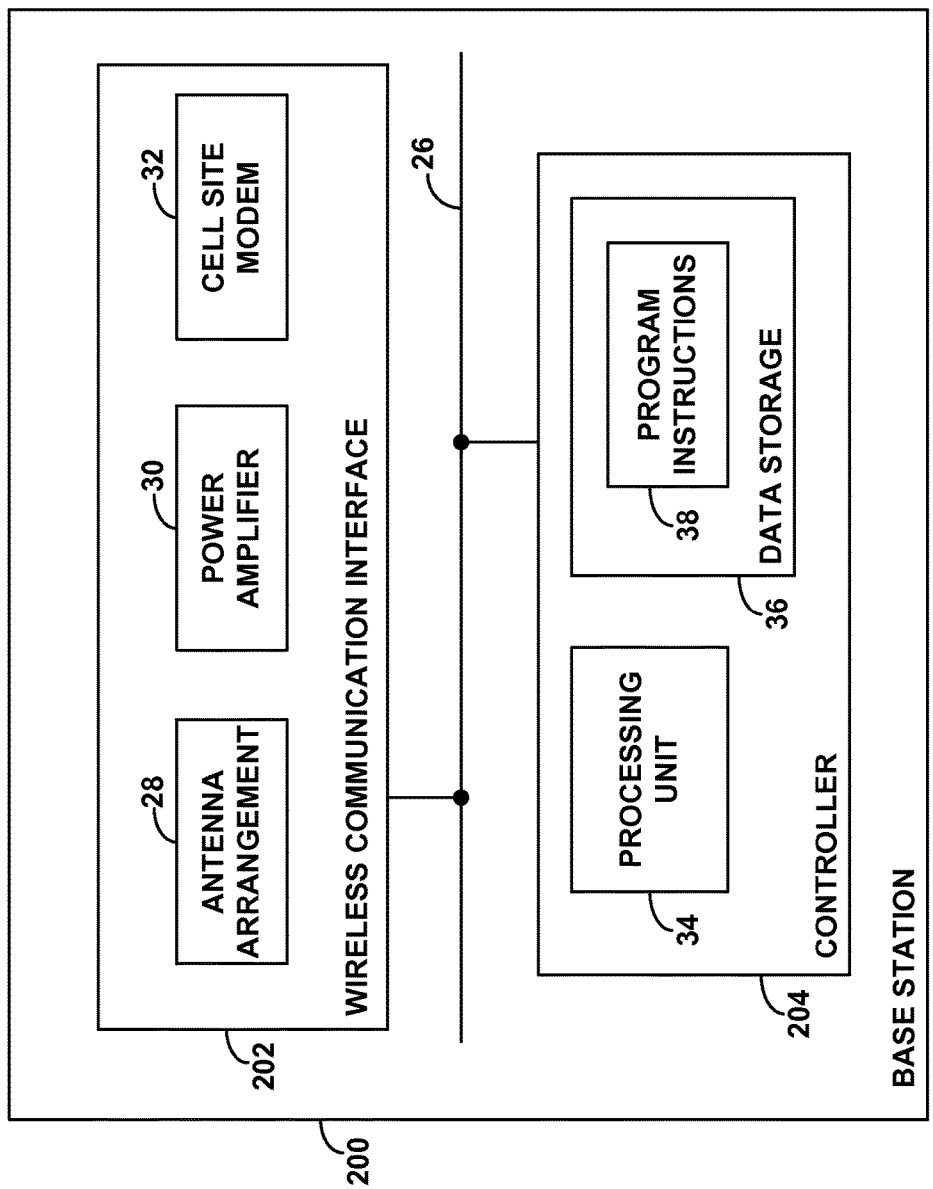
FIG. 2 is a simplified block diagram of a base station in which the present method can be implemented.

FIG. 2 is next a simplified block diagram of a representative base station 200 such as eNodeB 12, illustrating some of the components that can be included in such an entity. As shown in FIG. 2, the representative base station 200 may include a wireless communication interface 202 and a controller 204. As shown, these components of the base station 200 may be communicatively linked together by a system bus, network, or other connection mechanism 26. Alternatively, they may be integrated together in various ways.

As shown, wireless communication interface 202 may include an antenna arrangement 28, which may be tower mounted, and associated components such as a power amplifier 30 and a cell site modem 32 for engaging in air interface communication with UEs via the antenna arrangement 28, so as to transmit data and control information to the UEs and receive data and control information from the UEs. Additionally, controller 204 may include processing unit 34 and data storage 36 and is arranged to manage or carry out various functions such as those discussed herein.

Processing unit 34 may then comprise one or more general purpose processors (e.g., microprocessors) and/or special-purpose processors (e.g., digital signal processors and/or application specific integrated circuits) and may be integrated in whole or in part with the wireless communication interface 202. And data storage 36 may include one or more volatile and/or non-volatile storage components, such as magnetic, optical, flash, or other types of non-transitory computer readable media, and may be integrated in whole or in part with processing unit 34.

As shown, data storage 36 may hold (e.g., have encoded thereon) program instructions 38, which may be executable by processing unit 34 to carry out various controller functions. As such, the processing unit 34 programmed with instructions 38 may define part or all of a controller for controlling operation of the base station 200. Alternatively or additionally, however, such control functionality could be provided external to the base station 200, in another entity (e.g., separate from the base station 200) such as by a base station control entity (e.g., MME 18), which may be communicatively linked with the base station and may serve to control certain aspects of base station operation generally.

Figure 3:
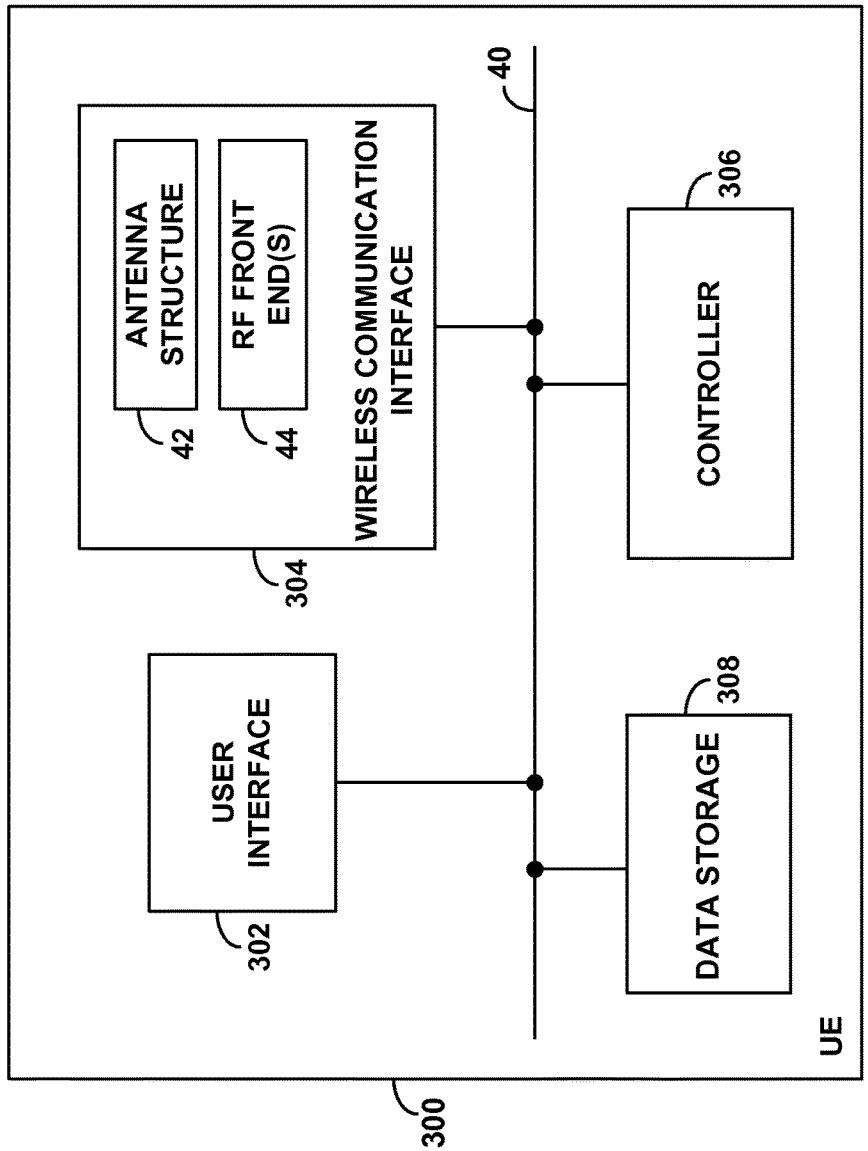
FIG. 3 is a simplified block diagram of a UE in which various UE functions can be implemented.

FIG. 3 is next a simplified block diagram of an example UE 300 such as UE 14, showing some of the components that may be included in such a device to facilitate carrying out various UE functions described herein. As shown, the example UE 300 includes a user interface 302, a wireless communication interface 304, a controller 306, and data storage 308, all of which could be integrated together in various ways or, as shown, interconnected with each other through a system bus, network, or other connection mechanism 40.

User interface 302 may include input and output components to facilitate interaction with a user, if the UE is a user-operable device. Wireless communication interface 304 includes an antenna structure 42 configured to transmit and receive over the air interface and thereby facilitate communication with a serving base station (e.g., eNodeB 12). Further, the wireless communication interface includes one or more radio frequency (RF) front ends 44 for interfacing between the antenna structure and one or more radios (not shown) or other components, so as to support air interface communication on various carriers.

In particular, the one or more RF front ends 44 of the UE may comprise active components configured to support bi-directional communication via the antenna structure 42 concurrently on multiple component carriers on which the UE is being served with carrier aggregation service. In an example wireless communication interface, the one or more RF front ends 44 would include at least two RF front ends, each supporting bi-directional communication on one or more component carriers, and each interfacing with one or more respective antennas.

Controller 306, which may be integrated with wireless communication interface 304 or with one or more other components, may then control various UE functions. And data storage 308 may include one or more volatile and/or non-volatile storage components, such as magnetic, optical, flash, or other types of non-transitory computer readable media, and may be integrated in whole or in part with controller 306.

Figure 4:
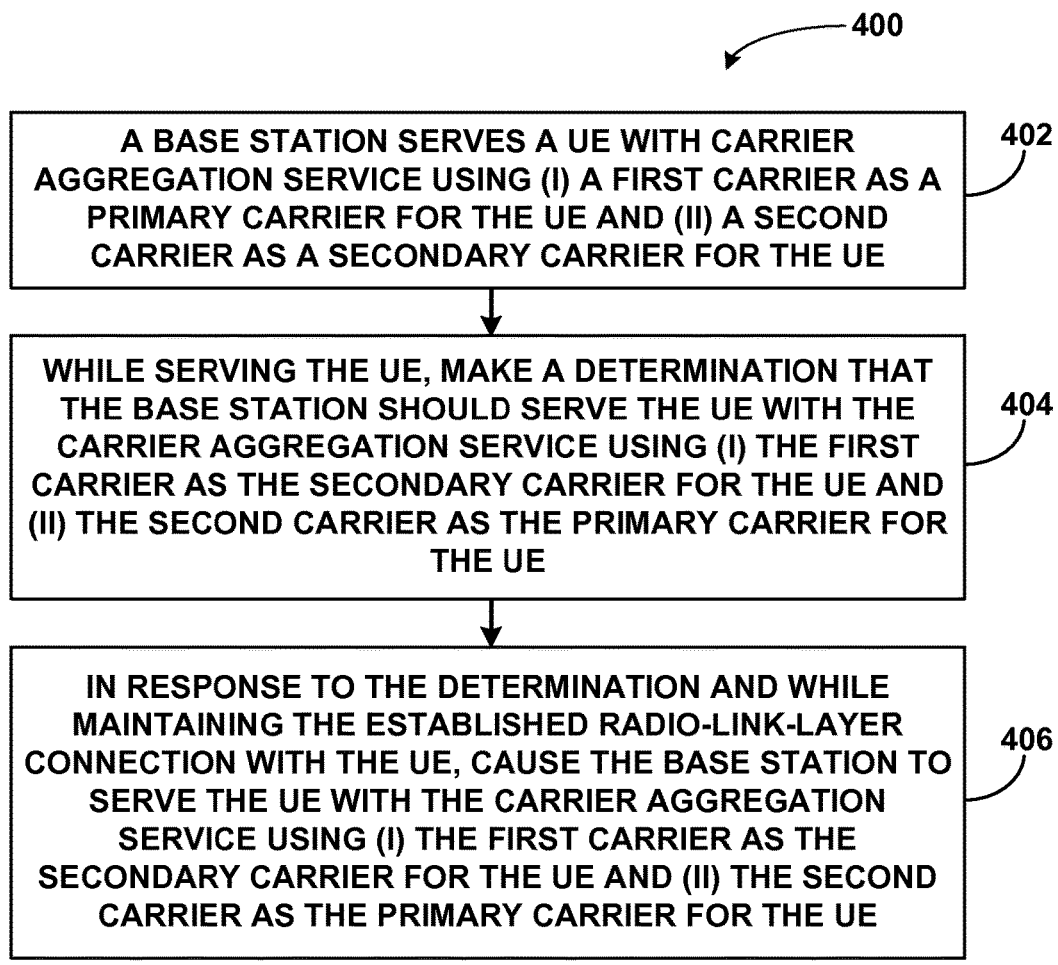
FIG. 4 is a flowchart illustrating a method for transitioning a UE to a new PCell without handover processing, in accordance with an example embodiment.

FIG. 4 is a flowchart illustrating a method 400, according to an example embodiment. Illustrative methods, such as method 400, may be carried out in whole or in part by component(s) and/or arrangement(s) in a wireless communication system, such as by the one or more of the components of the representative LTE network 10 shown in FIG. 1 and/or with one or more of the components of the base station 200 shown in FIG. 2. However, it should be understood that example methods, such as method 400, may be carried out by other entities or combinations of entities as well as in other arrangements, without departing from the scope of the disclosure.

In particular, method 400 may be operable in a wireless communication system that includes a base station (e.g., eNodeB 12) having an established radio-link-layer connection with a UE (e.g., UE 14). This radio-link-layer connection encompasses a first carrier and a second carrier and the base station is configured to provide the UE with carrier aggregation service using the first and second carriers.

As shown by block 402 in FIG. 4, method 400 involves the base station serving the UE with the carrier aggregation service using (i) the first carrier as a primary carrier for the UE and (ii) the second carrier as a secondary carrier for the UE. At block 404, method 400 then involves, while serving the UE, making a determination (e.g., by the base station or another entity of the system) that the base station should serve the UE with the carrier aggregation service using (i) the first carrier as the secondary carrier for the UE and (ii) the second carrier as the primary carrier for the UE. At block 406, method 400 then involves, in response to the determination and while maintaining the established radio-link-layer connection with the UE, the system causing the base station to serve the UE with the carrier aggregation service using (i) the first carrier as the secondary carrier for the UE and (ii) the second carrier as the primary carrier for the UE.

In a wireless communication system, each coverage area may have a respective coverage area identifier, such as a Physical Cell Identity (PCI) and/or pseudo-noise offset (PN offset) for instance, which could be indicated by the pilot or reference signal or specified in another overhead broadcast message or signal. When the UE 14 first powers on or enters into coverage of the network, the UE 14 may scan for pilot or reference signals and determine for each detected signal a signal level (e.g., receive strength or signal-to-noise ratio) and corresponding coverage area identifier (e.g., PCI or PN offset). The UE 14 may thereby identify a coverage area providing the strongest pilot or reference signal and may engage in a process to register with the network by transmitting an attach request to the base station that is providing that signal.

With this arrangement, when UE 14 enters into coverage of eNodeB 12, the UE 14 may detect eNodeB 12 coverage on a particular carrier, and the UE 14 may engage in an attach process (or handover process) to register with the LTE network 10 on that carrier. As noted above, the UE 14 may initially transmit to the eNodeB 12 an attach request, which the eNodeB 12 may pass along to the MME 18, triggering a process of authenticating the UE 14 and establishment of one or more logical bearer connections for the UE 14 between the eNodeB 12 and the PGW 22.

Additionally, the UE 14 may engage in signaling with the eNodeB 12 to establish a radio-link-layer connection (i.e., air interface connection) on the particular carrier, so that the eNodeB 12 may then serve the UE 14 on that carrier. For instance, the UE 14 and eNodeB 12 may exchange RRC configuration messaging in order to prepare the eNodeB 12 to serve the UE 14 on the carrier and to prepare the UE 14 to be served on the carrier. In this process, the eNodeB 12 may store a context record for the UE 14, indicating that the eNodeB 12 is serving the UE 14 on the particular carrier such as by storing a global identifier (e.g., Absolute Radio Frequency Channel Number (ARFCN)) of the carrier for instance. In this manner, the eNodeB 12 may then serve the UE 14 on the particular carrier (e.g., then exchanging control signaling and bearer traffic with the UE 14 on that carrier) per that context record.

Further, the UE 14 may also store a context record (e.g., on data storage 308) indicating that the UE 14 is being served on that particular carrier such as by storing the global identifier (e.g., ARFCN) of the carrier for instance. Once the context record is stored, the UE can then be served on that carrier (e.g., then exchanging control signaling and bearer traffic with the eNodeB 12 on that carrier) per that context record. As such, the radio-link-layer connection could be considered to effectively encompass initially just that one carrier.

During this initial attach process and/or later while serving the UE 14, the eNodeB 12 and UE 14 may engage in RRC configuration messaging and/or other processing to modify or otherwise set the UE's radio-link-layer connection to encompass a different number of carriers. In particular, the eNodeB 12 and UE 14 may arrange the UE's radio-link-layer connection to encompass two or more carriers so as to facilitate carrier aggregation service. To set or adjust the carriers encompassed by the radio-link-layer connection for the UE 14, the eNodeB 12 may transmit to the UE 14 an RRC connection reconfiguration message that specifies the carriers on which the eNodeB 12 will be serving the UE 14, such as by identifying each carrier by a respective global identifier (e.g., ARFCN) for instance.

To facilitate carrier aggregation service, the eNodeB 12 may designate (e.g., via the RRC connection reconfiguration message) one such carrier by a special primary carrier index (also referred to as a PCell index) and the eNodeB 12 may designate each other carrier by a special secondary carrier index (also referred to as an SCell index). By standard, an index of 0 (zero) is the index used to identify the primary carrier for the UE 14 and any of 1 to 7 are used as an index respectively to identify each secondary carrier for the UE 14. Moreover, when the eNodeB 12 instructs the UE 14 to use a given carrier as a secondary carrier, the eNodeB 12 informs the UE 14 of a particular index to use for referring to that carrier.

With this arrangement, the eNodeB 12 may update its context record for the UE 14 to indicate that the UE's radio-link-layer connection now encompasses the indicated carriers, so that the eNodeB 12 may then engage in communication with the UE 14 on those carriers. And the UE 14 may responsively update its context record to indicate that the UE's radio-link-layer connection now encompasses the indicated carriers, so that the UE 14 will be prepared to engage in communication with the eNodeB 12 on those carriers. This may specifically involve the UE 14 storing the respective global identifier (e.g., ARFCN) for each of the carriers as well as the respective designated index for each carrier, so that the UE 14 can tune to the appropriate primary and secondary carriers as the UE 14 is being served by the eNodeB 14.

This or another process could be used to add or remove one or more carriers from a UE's radio-link-layer connection. For example, if the connection currently encompasses just one carrier, the process could be used to change the connection to add one or more additional carriers (e.g., as SCells) so as to facilitate carrier aggregation service. As another example, if the connection currently encompasses two or more carriers, the process could be used to add one or more additional carriers to the connection so as to provide increased carrier aggregation, or to remove one or more carriers from the connection so as to provide reduced carrier aggregation or to switch to single-carrier service. Other examples are possible as well.

Figure 5:
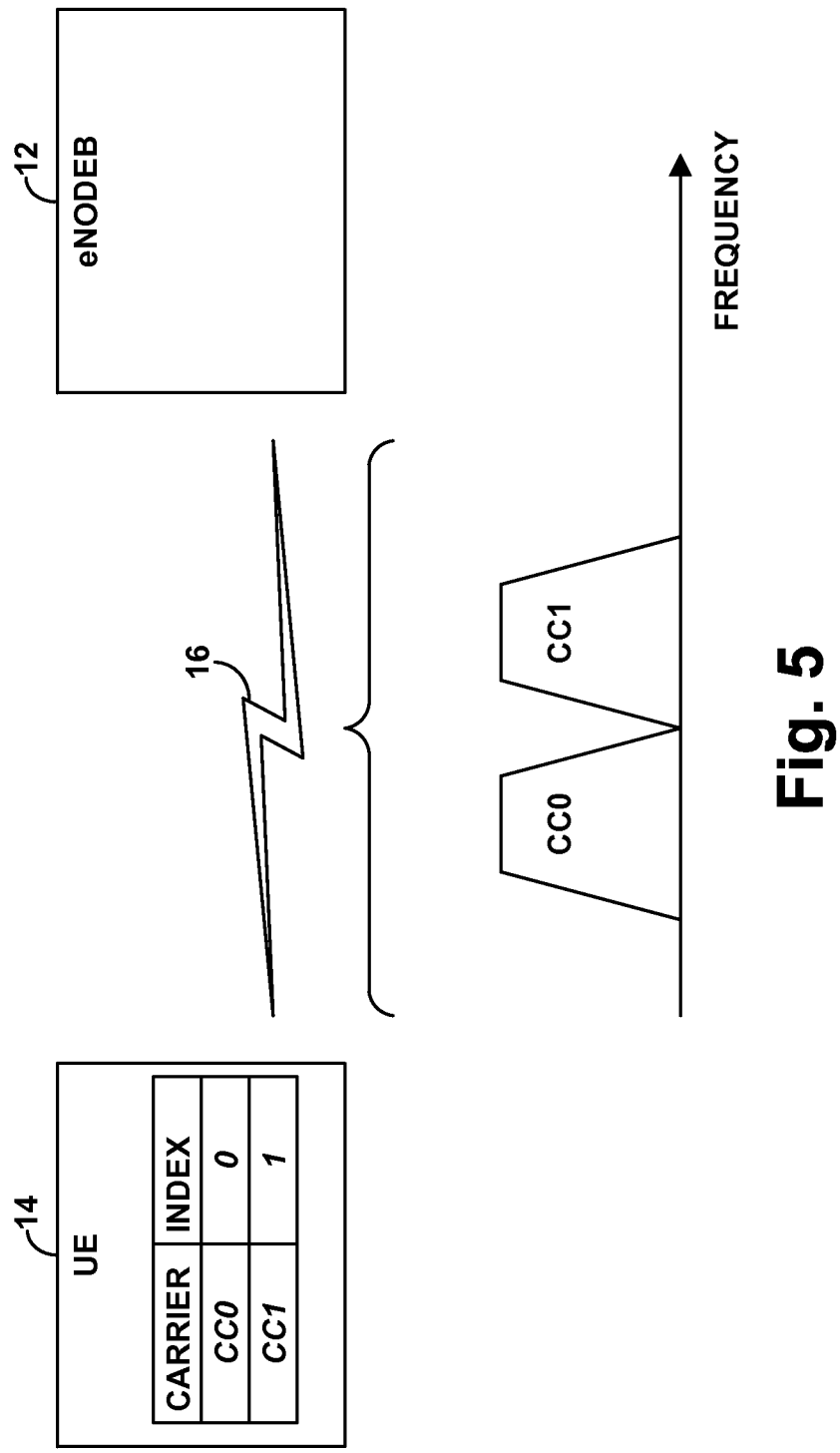
FIGS. 5-7 are illustrations depicting example transition of a UE to a new PCell without handover processing, in accordance with an example embodiment.

FIG. 5 is an example depiction of an established radio-link-layer connection (e.g., over air interface 16) that encompasses a first carrier CC0 and a second carrier CC1. With this arrangement, the eNodeB 12 serves the UE 14 with carrier aggregation service using the first carrier CC0 as a primary carrier for the UE and using the second carrier CC1 as a secondary carrier for the UE. Moreover, FIG. 5 shows the UE 14 as having stored designations for the carriers. In particular, the UE 14 has stored a 0 (zero) index to identify the first carrier CC0 as the primary carrier for the UE 14 and also has stored a 1 index to identify the second carrier CC1 as a secondary carrier for the UE 14. Note that the 1 index is used for illustration purposes only and is not meant to be limiting as the UE could store any one of the 1 to 7 indexes to identify the second carrier CC1 as a secondary carrier for the UE 14. Other example designations are also possible.

As noted above, block 404 of method 400 involves, while serving the UE, making a determination that the base station should serve the UE with the carrier aggregation service using (i) the first carrier (e.g., CC0) as the secondary carrier for the UE and (ii) the second carrier (e.g., CC1) as the primary carrier for the UE. Such a determination is made by the base station or by another entity of the system.

A wireless communication system may encounter one of various triggers that could lead to such a determination. In one example, the system may determine that the first carrier CC0 is threshold loaded and thus lacks sufficient resources for appropriately serving as the primary carrier for the UE 14. In a specific example, the system may determine that a control channel of the first carrier CC0 is threshold loaded and thus the first carrier CC0 may encounter issues with transmission of control signaling. Since operations of a primary carrier may involve transmission of control signaling, such a determination amounts to the first carrier CC0 lacking sufficient resources for appropriately serving as the primary carrier for the UE 14. In another example, the system may determine that the first carrier CC0 has channel quality that is below a threshold quality. Since the primary carrier is used for transmission of control signaling between the UE 14 and the eNodeB 12, the system may ensure that the primary carrier provides for relatively high channel quality. Thus, the determination in this example may serve as indication to the system that the UE 14 should transition to being served by a different carrier as the primary carrier for the UE 14. Other examples are also possible.

As noted above, block 406 of method 400 then involves, in response to the determination and while maintaining the established radio-link-layer connection with the UE, the system causing the base station to serve the UE with the carrier aggregation service using (i) the first carrier as the secondary carrier for the UE and (ii) the second carrier as the primary carrier for the UE.

Figure 6:
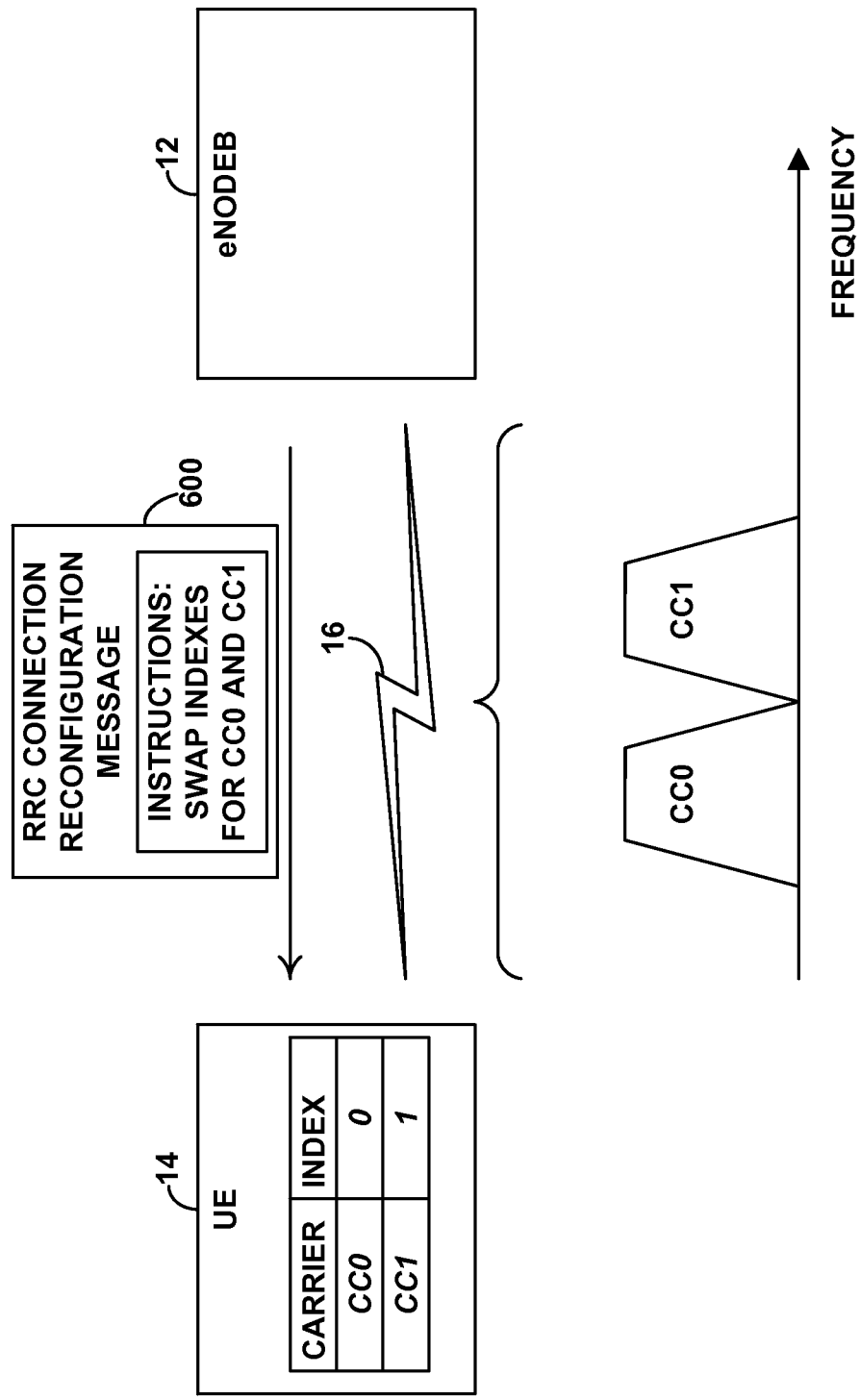

In an example implementation, the eNodeB 12 may instruct the UE 14 to swap the stored designations (e.g., indexes) that correspond to the first carrier CC0 and the second carrier CC1. In particular, the eNodeB 12 may do so while maintaining the established radio-link-layer connection, thereby avoiding the handover processing discussed above. To do so, the eNodeB 12 may transmit to the UE 14 a radio-link control message including instructions for the UE 14 to carry out this swap. For instance, FIG. 6 depicts the eNodeB 12 transmitting to the UE 14 an RRC connection reconfiguration message 600 over the air interface 16. The message 600 is shown to include instructions for the UE 14 carry out the swap such that the 0 (zero) index specifies the second carrier CC1 as the primary carrier for the UE 14 and such that the 1 index specifies the first carrier CC0 as a secondary carrier for the UE 14. By way of example, the instructions may be in the form of specifying the carriers (e.g., CC0 and CC1) on which the eNodeB 12 will be serving the UE 14 (e.g., by identifying each carrier by the respective global identifier (e.g., ARFCN)) as well as specifying the updated indexes for each carrier respectively. Note, however, that the instructions may take on another form as well.

Figure 7:
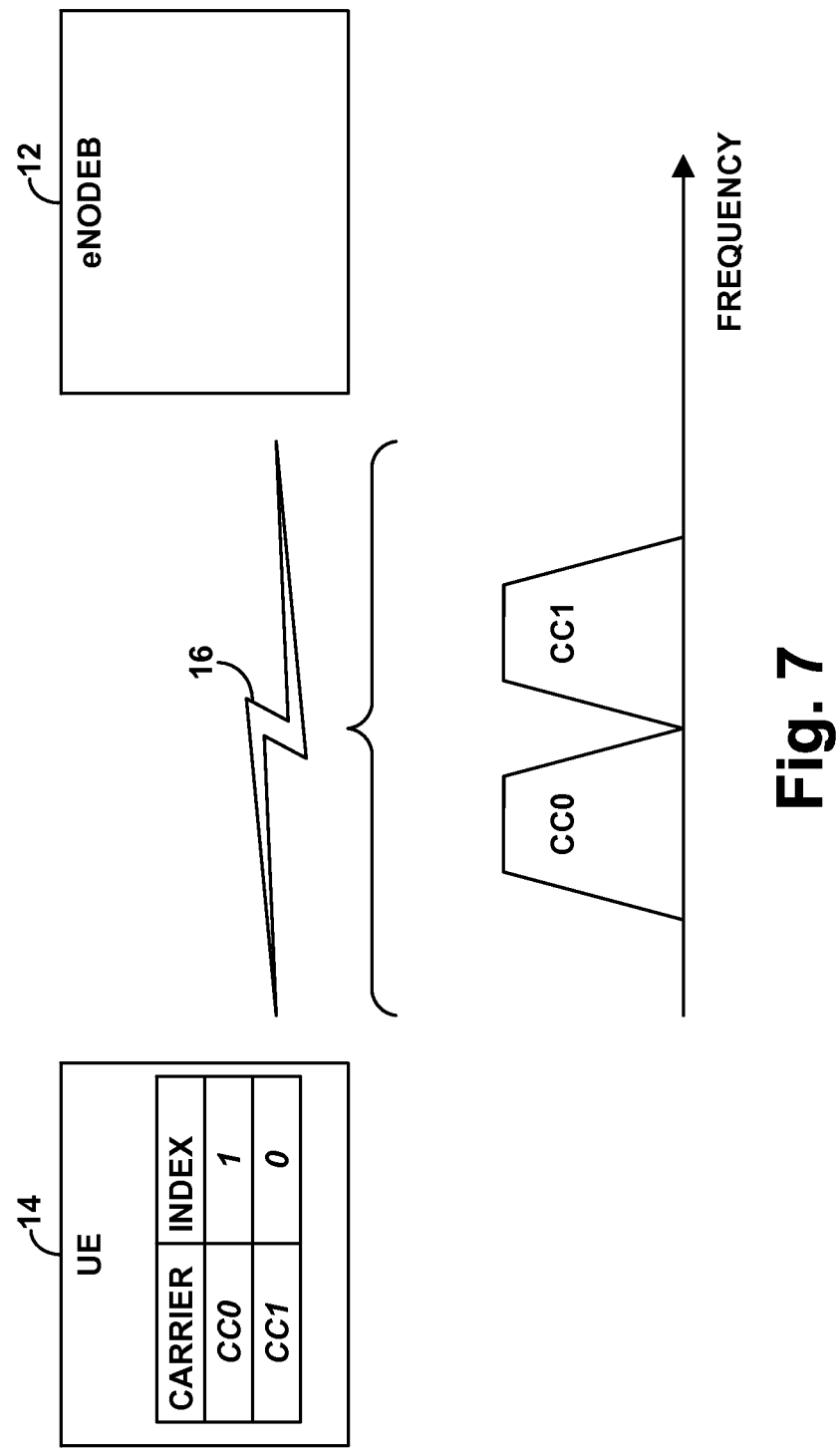

Once the UE 14 receives the message 600 from the eNodeB 12, the UE 14 may process the instructions. In particular, the UE 14 may update its stored context record to reflect the updated indexes for each carrier. For instance, FIG. 7 depicts the second carrier CC1 as being designated by the 0 (zero) index, thereby designating the second carrier CC1 as the primary carrier for the UE 14. Also, FIG. 7 depicts the first carrier CC0 as being designated by the 1 index, thereby designating the first carrier CC0 as a secondary carrier for the UE 14. In some cases, however, the instructions may alternatively designate the first carrier CC0 with any of the 1 to 7 indexes that correspond to a carrier being a secondary carrier. In either case, once the UE 14 carries out the swap, the UE 14 can then tune to the second carrier CC1 as the primary carrier in the carrier aggregation service and to the first carrier CC0 as a secondary carrier in the carrier aggregation service.

Moreover, in this process, the eNodeB 12 may also update its context record for the UE 14 to indicate that the UE's radio-link-layer connection now encompasses the second carrier CC1 as the primary carrier for the UE 14 and the first carrier CC0 as a secondary carrier for the UE 14. In this manner, the eNodeB 12 may then appropriately serve the UE 14 on the first and second carriers CC0, CC1 (e.g., then exchanging control signaling and bearer traffic with the UE 14 on the appropriate carriers) per that updated context record.

Figure 8:
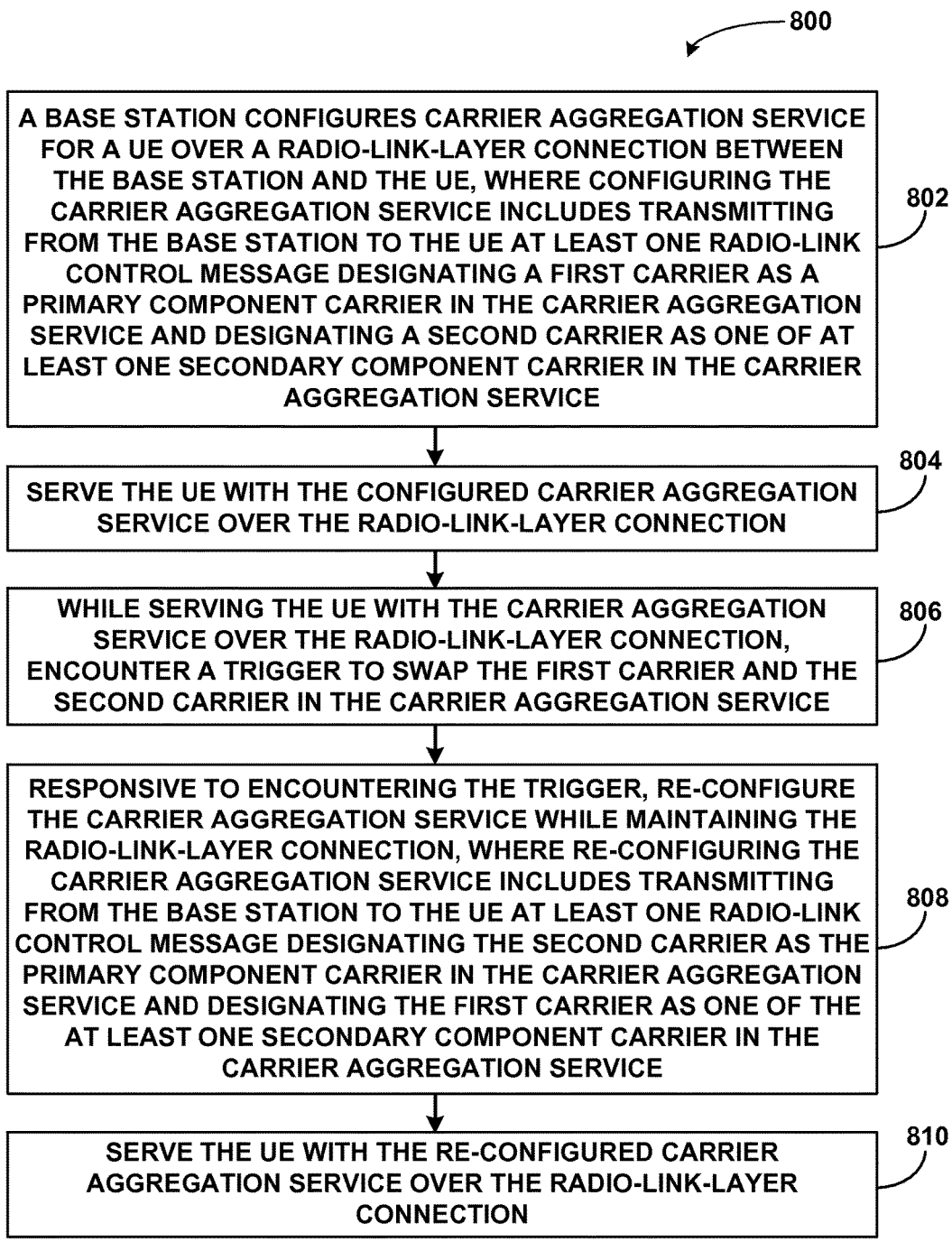
FIG. 8 is another flowchart illustrating a method for transitioning a UE to a new PCell without handover processing, in accordance with an example embodiment.

FIG. 8 is next a flow chart depicting another example set of operations that can be carried out by a wireless communication system in an implementation of this process. In an example implementation, the illustrated process relates to managing component carriers in carrier aggregation service. As shown in FIG. 8, at block 802, a base station configures carrier aggregation service for a UE over a radio-link-layer connection between the base station and the UE. In particular, configuring the carrier aggregation service includes transmitting from the base station to the UE at least one radio-link control message designating a first carrier as a primary component carrier in the carrier aggregation service and designating a second carrier as one of at least one secondary component carrier in the carrier aggregation service.

Further, at block 804, the base station serves the UE with the configured carrier aggregation service over the radio-link-layer connection. And at block 806, while serving the UE with the carrier aggregation service over the radio-link-layer connection, the wireless communication system (e.g., the base station or another entity of the system) encounters a trigger to swap the first carrier and the second carrier in the carrier aggregation service.

At block 808, responsive to encountering the trigger, the base station re-configures the carrier aggregation service while maintaining the radio-link-layer connection. In particular, re-configuring the carrier aggregation service includes transmitting from the base station to the UE at least one radio-link control message designating the second carrier as the primary component carrier in the carrier aggregation service and designating the first carrier as one of the at least one secondary component carrier in the carrier aggregation service. Yet further, at block 810, the base station serves the UE with the re-configured carrier aggregation service over the radio-link-layer connection. Various other features described above could be incorporated into this method as well.

Figure 9:
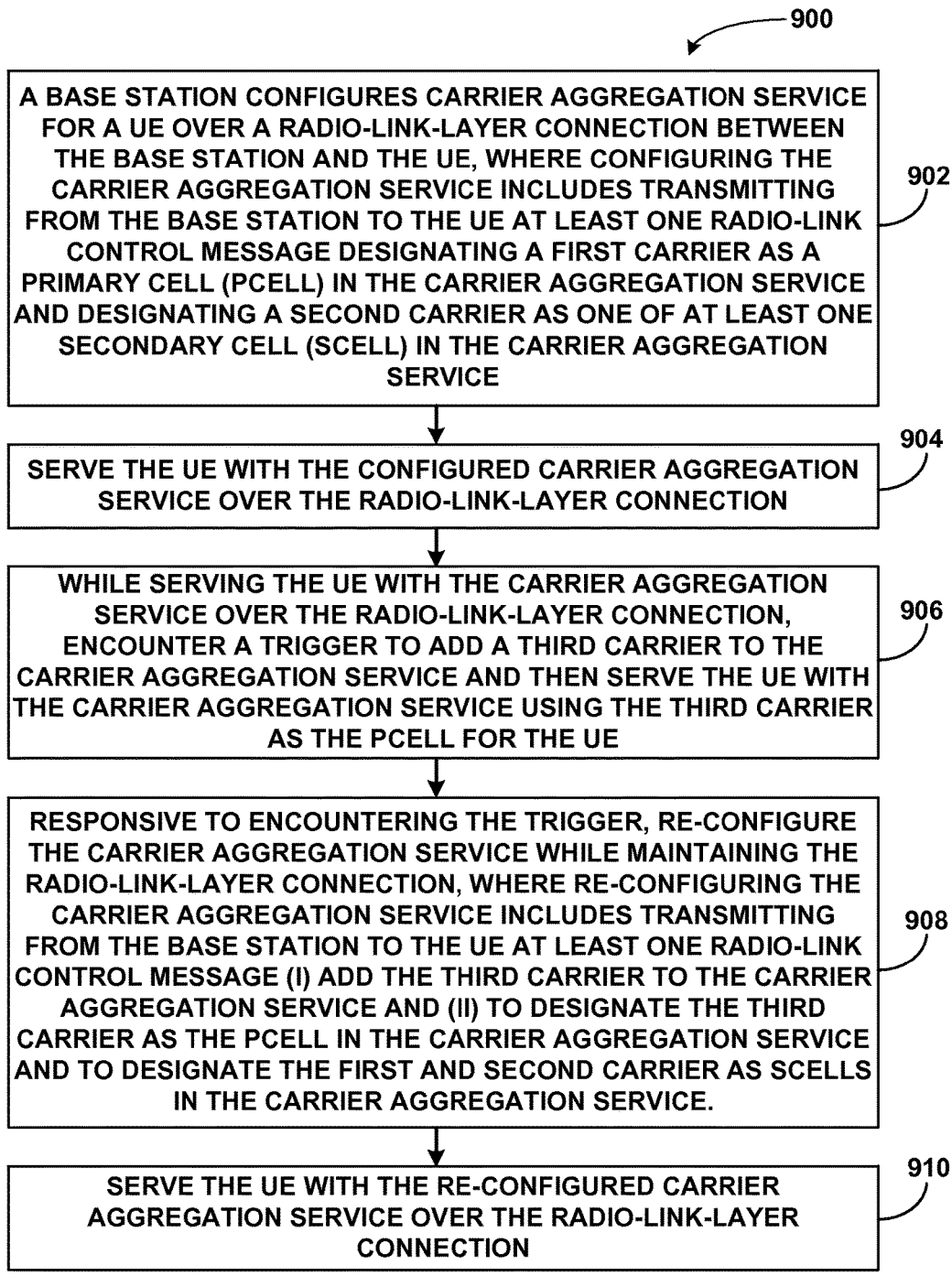
FIG. 9 is yet another flowchart illustrating a method for transitioning a UE to a new PCell without handover processing, in accordance with an example embodiment.

FIG. 9 is next a flow chart depicting yet another example set of operations that can be carried out by a wireless communication system in an implementation of this process. As shown in FIG. 9, at block 902, a base station configures carrier aggregation service for a UE over a radio-link-layer connection between the base station and the UE. In particular, configuring the carrier aggregation service includes transmitting from the base station to the UE at least one radio-link control message designating a first carrier as a PCell in the carrier aggregation service and designating a second carrier as one of at least one SCell in the carrier aggregation service.

Further, at block 904, the base station serves the UE with the configured carrier aggregation service over the radio-link-layer connection. And at block 906, while serving the UE with the carrier aggregation service over the radio-link-layer connection, the wireless communication system (e.g., the base station or another entity of the system) encounters a trigger to add a third carrier to the carrier aggregation service and then serve the UE with the carrier aggregation service using the third carrier as the PCell for the UE.

At block 908, responsive to encountering the trigger, the base station re-configures the carrier aggregation service while maintaining the radio-link-layer connection. In particular, re-configuring the carrier aggregation service includes transmitting from the base station to the UE at least one radio-link control message (i) to add the third carrier to the carrier aggregation service and (ii) to designate the third carrier as the PCell in the carrier aggregation service and to designate the first and second carriers as SCells in the carrier aggregation service. Yet further, at block 910, the base station serves the UE with the re-configured carrier aggregation service over the radio-link-layer connection. Various other features described above could be incorporated into this method as well.

As noted above, a wireless communication system may determine that the UE 14 should transition to using a different carrier as the primary carrier for the UE 14. In some situations, this different carrier may be a carrier on which the UE 14 is not being served (e.g., not configured as part of the carrier aggregation service). Various circumstances may lead to this situation. For instance, the system may determine that the UE 14 should be served on a primary carrier having at least a threshold quality of service. In this instance, the system may also determine that none of the carriers on which the UE 14 is being served are capable of providing a quality of service that exceeds this threshold quality of service. Thus, the system may find a carrier on which the UE is not being served that can provide for a quality of service exceeding the threshold quality of service, and may then seek to transition the UE 14 to use this carrier as the primary carrier for the UE 14.

Figure 10:
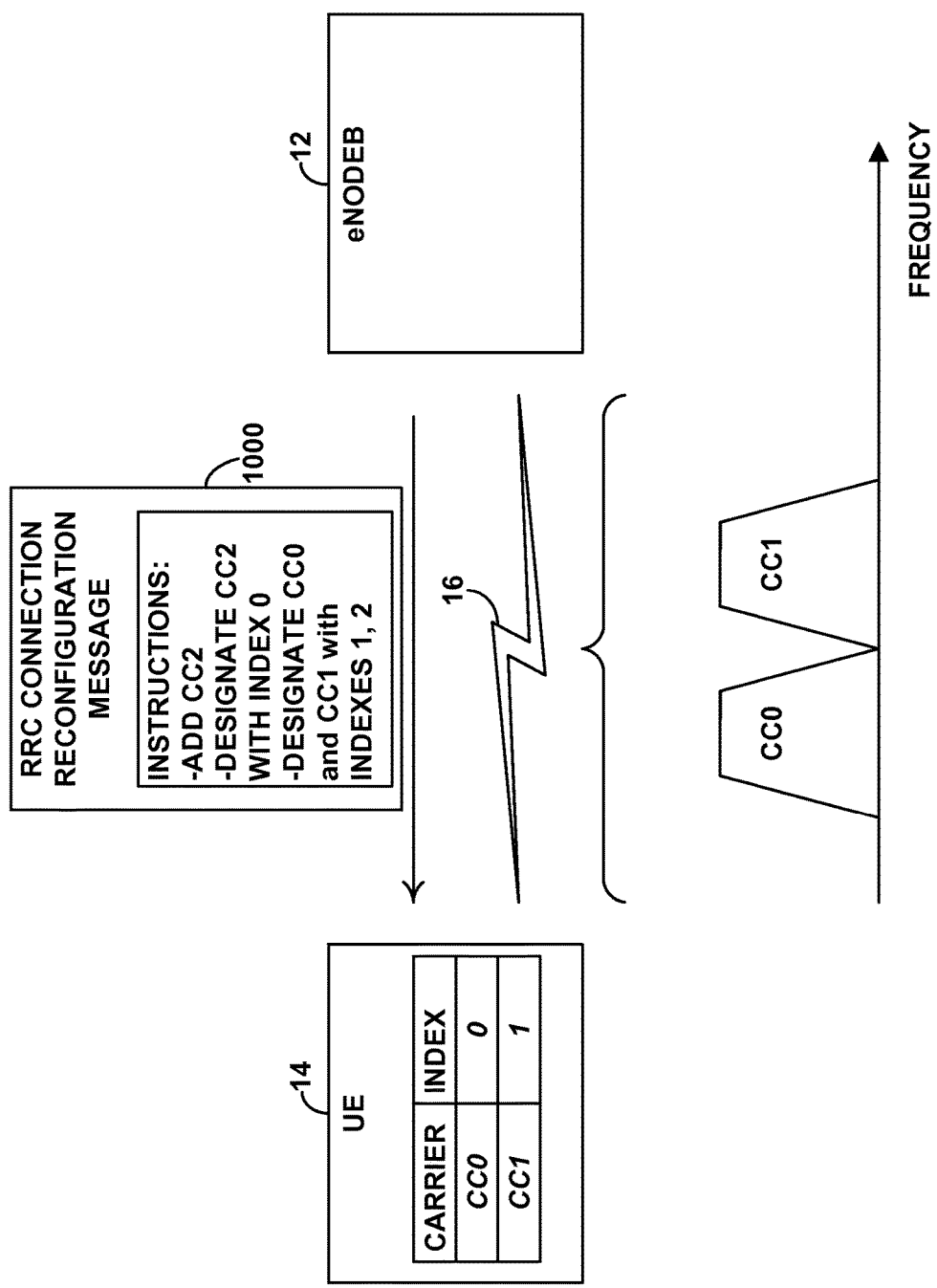
FIGS. 10-11 are illustrations depicting another example transition of a UE to a new PCell without handover processing, in accordance with an example embodiment.

In an example implementation, the system may add this carrier to the carrier aggregation service and then designate this carrier as the primary carrier for the UE 14. To do so, the eNodeB 12 may send one or more radio-link control messages to the UE 14 while maintaining the established radio-link-layer connection. For example, FIG. 10 depicts the arrangement first introduced above in association with FIG. 5 and also depicts an example radio-link control message taking the form of an RRC connection reconfiguration message 1000. As shown, the message 1000 includes instructions for the UE 14 to add a third carrier CC2 to the carrier aggregation service that already includes the first carrier CC0 and the second carrier CC1.

Additionally, the message 1000 also includes instructions to designate the third carrier CC2 with index 0, thereby designating the third carrier CC2 as the primary carrier for the UE 14. Further, the message also includes instructions to designate the first and second carriers CC0, CC1 with the 1 and 2 indexes, thereby designating the first and second carriers CC0, CC1 as secondary carriers for the UE 14. In one case, the instructions may designate the first carrier CC0 with the 1 index and may designate the second carrier CC1 with the 2 index. In another case, the instructions may designate the first carrier CC0 with the 2 index and may designate the second carrier CC1 with the 1 index.

Figure 11:
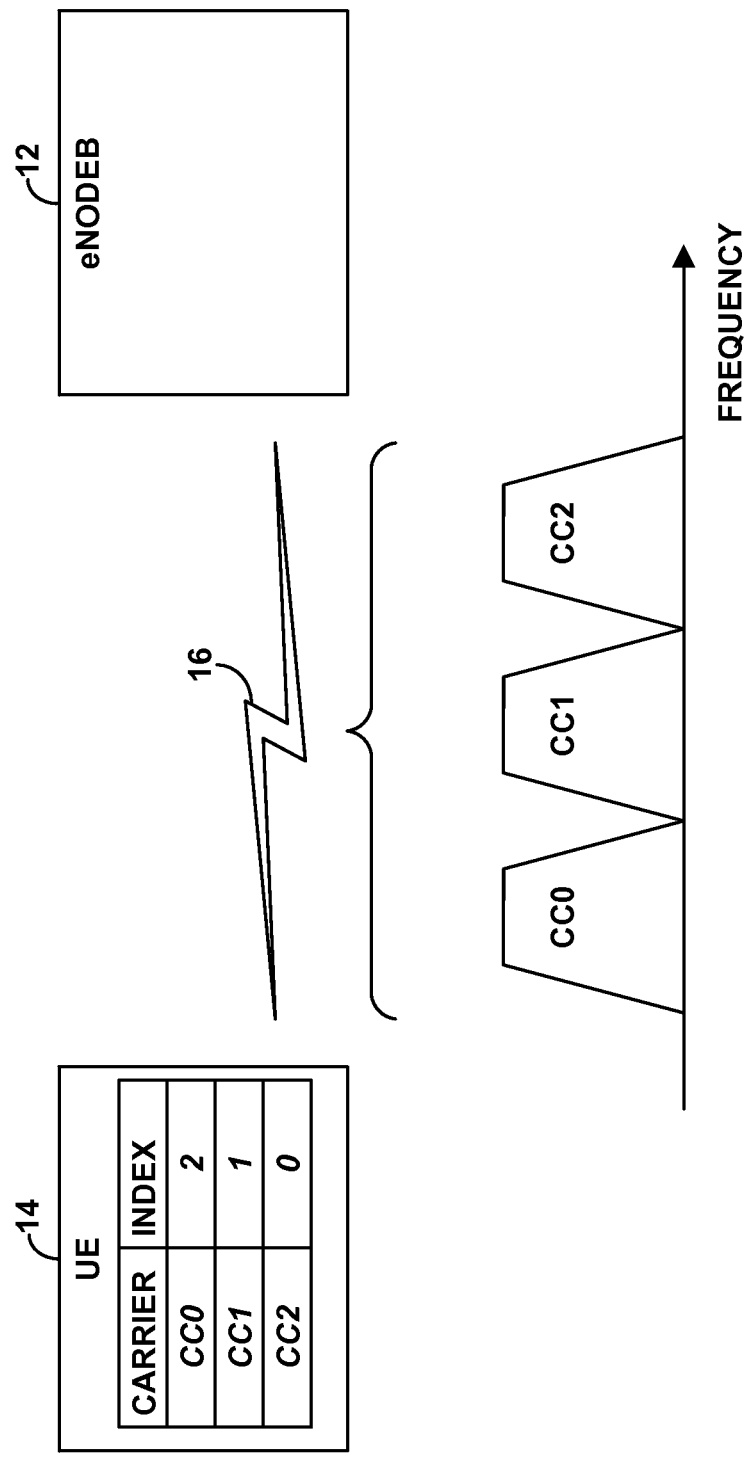

In other cases, however, the instructions may designate the first carrier CC0 and the second carrier CC1 with respective indexes that are within any of the 1 to 7 indexes that correspond to a carrier being a secondary carrier. In either case, once the UE 14 receives the message 1000, the UE 14 can process the instructions and then tune to the third carrier CC2 as the primary carrier in the carrier aggregation service and to the first and second carriers CC0, CC1 as secondary carriers in the carrier aggregation service, as shown in FIG. 11 for instance.

In another implementation, the eNodeB 12 may transmit multiple radio-link control messages over to the UE 14. For instance, the eNodeB 12 may send a first RRC connection reconfiguration message including instructions to add the third carrier CC2 to the carrier aggregation service that already includes the first carrier CC0 and the second carrier CC1. These instructions may provide the global identifier for the third carrier CC2 and may designate the third carrier CC2 with an index corresponding to the third carrier CC2 being a secondary carrier for the UE 14, such as the 2 index for example. Once the UE 14 receives the first message, the UE 14 may process the instructions to add the third carrier CC2 as a secondary carrier and could send acknowledgement to the eNodeB 12 to indicate that the third carrier CC2 has been added.

The eNodeB 12 may then send a second RRC connection reconfiguration message including instructions to swap the stored designation of the third carrier CC2 (e.g., 2 index) with the stored designation of the first carrier CC0 (e.g., 0 index). Once the UE 14 receives the second message, the UE 14 may carry out the swap such that the third carrier CC2 is designated as the primary carrier for the UE 14 (e.g., with the 0 index) such that the first carrier CC0 is designated as a secondary carrier for the UE 14. Once the UE 14 carries out the swap, the UE 14 can tune to the third carrier CC2 as the primary carrier in the carrier aggregation service.

Exemplary embodiments have been described above. Those skilled in the art will understand, however, that changes and modifications may be made to these embodiments without departing from the true scope and spirit of the invention.

We claim:

1. A method operable in a wireless communication system including a base station having an established radio-link-layer connection with a user equipment device (UE), wherein the radio-link-layer connection encompasses a first carrier and a second carrier, and wherein the base station is configured to provide the UE with carrier aggregation service using the first and second carriers, the method comprising:

serving the UE, by the base station, with the carrier aggregation service using (i) the first carrier as a primary carrier for the UE and (ii) the second carrier as a secondary carrier for the UE, wherein the UE has data storage containing a first designation specifying the first carrier as the primary carrier for the UE and a second designation specifying the second carrier as the secondary carrier for the UE;

while serving the UE, making a determination that the base station should serve the UE with the carrier aggregation service using (i) the first carrier as the secondary carrier for the UE and (ii) the second carrier as the primary carrier for the UE; and in response to the determination and while maintaining the established radio-link-layer connection with the UE, instructing the UE to carry out a swapping of the first and second designations, wherein the swapping causes the first designation to specify the second carrier as the primary carrier for the UE and causes the second designation to specify the first carrier as the secondary carrier for the UE, thereby facilitating serving of the UE with the carrier aggregation service using (i) the first carrier as the secondary carrier for the UE and (ii) the second carrier as the primary carrier for the UE.

2. The method of claim 1, wherein instructing the UE to carry out the swapping comprises transmitting to the UE a radio resource control (RRC) connection reconfiguration message including instructions for the UE to carry out the swapping.

3. The method of claim 1, wherein making the determination is in response to detecting that the first carrier is threshold loaded.

4. The method of claim 3, wherein detecting that the first carrier is threshold loaded comprises detecting that a control channel of the first carrier is threshold loaded.

5. The method of claim 1, wherein making the determination is in response to detecting that the first carrier has a channel quality that is below a threshold quality.

6. The method of claim 1, wherein serving the UE comprises at least transmitting control signaling and bearer traffic between the base station and the UE, wherein the control signaling is transmitted only on the primary carrier, and wherein the bearer traffic is transmitted on one or both of the primary and secondary carriers.

7. A method for managing component carriers in carrier aggregation service, the method comprising:
configuring, by a base station, carrier aggregation service for a user equipment device (UE) over a radio-link-layer connection between the base station and the UE, wherein configuring the carrier aggregation service comprises transmitting from the base station to the UE at least one radio-link control message designating a first carrier as a primary component carrier in the carrier aggregation service and designating a second carrier as one of at least one secondary component carrier in the carrier aggregation service, wherein the UE has data storage, and wherein, after the base station configures the carrier aggregation service for the UE, the data storage contains a first designation specifying the first carrier as the primary component carrier in the carrier aggregation service and a second designation specifying the second carrier as one of at least one secondary component carrier in the carrier aggregation service;
serving the UE with the configured carrier aggregation service over the radio-link-layer connection;
while serving the UE with the carrier aggregation service over the radio-link-layer connection, encountering a trigger to swap the first carrier and the second carrier in the carrier aggregation service;
responsive to encountering the trigger, re-configuring the carrier aggregation service while maintaining the radio-link-layer connection, wherein re-configuring the carrier aggregation service comprises transmitting from the base station to the UE at least one radio-link control message instructing the UE to carry out a swapping of the first and second designations, and wherein the swapping causes the first designation to specify the second carrier as the primary component carrier in the carrier aggregation service and causes the second designation to specify the first carrier as one of at least one secondary component carrier in the carrier aggregation service; and
serving the UE with the re-configured carrier aggregation service over the radio-link-layer connection.

8. The method of claim 7, wherein the at least one radio-link control message comprises a radio resource control (RRC) connection reconfiguration message.

9. The method of claim 7, wherein encountering the trigger comprises detecting that the first carrier is threshold loaded.

10. The method of claim 9, wherein detecting that the first carrier is threshold loaded comprises detecting that a control channel of the first carrier is threshold loaded.

11. The method of claim 7, wherein encountering the trigger comprises detecting that the first carrier has a channel quality that is below a threshold quality.

12. The method of claim 7, wherein serving the UE comprises at least transmitting control signaling and bearer traffic between the base station and the UE, wherein the control signaling is transmitted only on the primary carrier, and wherein the bearer traffic is transmitted on one or both of the primary and secondary carriers.

13. A wireless communication system comprising:
a base station; and
a controller configured to cause the base station to perform operations comprising:
configuring carrier aggregation service for a user equipment device (UE) over a radio-link-layer connection between the base station and the UE, wherein configuring the carrier aggregation service comprises transmitting from the base station to the UE at least one radio-link control message designating a first carrier as a primary cell (PCell) in the carrier aggregation service and designating a second carrier as one of at least one secondary cell (SCell) in the carrier aggregation service, wherein the UE has data storage, and wherein, after the configuring of the carrier aggregation service for the UE, the data storage contains a first designation specifying the first carrier as the PCell in the carrier aggregation service and a second designation specifying the second carrier as one of at SCell in the carrier aggregation service;
serving the UE with the configured carrier aggregation service over the radio-link-layer connection;
while serving the UE with the carrier aggregation service over the radio-link-layer connection, encountering a trigger to swap the first carrier and the second carrier in the carrier aggregation service;
responsive to encountering the trigger, re-configuring the carrier aggregation service while maintaining the radio-link-layer connection, wherein re-configuring the carrier aggregation service comprises transmitting from the base station to the UE at least one other radio-link control message instructing the UE to carry out a swapping of the first and second designations, and wherein the swapping causes the first designation to specify the second carrier as the PCell in the carrier aggregation service and causes the second designation to specify the first carrier as one of at least one SCell in the carrier aggregation service; and
serving the UE with the re-configured carrier aggregation service over the radio-link-layer connection.

14. The wireless communication system of claim 13, wherein encountering the trigger comprises detecting that the first carrier is threshold loaded.

15. The wireless communication system of claim 14, wherein detecting that the first carrier is threshold loaded comprises detecting that a control channel of the first carrier is threshold loaded.

16. The wireless communication system of claim 13, wherein encountering the trigger comprises detecting that the first carrier has a channel quality that is below a threshold quality.

17. The wireless communication system of claim 13, wherein serving the UE comprises at least transmitting control signaling and bearer traffic between the base station and the UE, wherein the control signaling is transmitted only on the primary carrier, and wherein the bearer traffic is transmitted on one or both of the primary and secondary carriers.

\* \* \* \* \*